(12) United States Patent
Frolov

(10) Patent No.: US 9,505,068 B2
(45) Date of Patent: Nov. 29, 2016

(54) HEIGHT ADJUSTMENT MECHANISM FOR POWER TOOL

(71) Applicants: Robert Bosch Tool Corporation, Broadview, IL (US); Robert Bosch GmbH, Stuttgart (DE)

(72) Inventor: Andrew Frolov, Glenview, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 146 days.

(21) Appl. No.: 14/207,725

(22) Filed: Mar. 13, 2014

(65) Prior Publication Data

US 2014/0260869 A1    Sep. 18, 2014

Related U.S. Application Data

(60) Provisional application No. 61/779,111, filed on Mar. 13, 2013.

(51) Int. Cl.
  *B23D 45/06* (2006.01)
  *B23D 45/02* (2006.01)

(52) U.S. Cl.
  CPC .......... *B23D 45/068* (2013.01); *B23D 45/024* (2013.01); *B23D 45/062* (2013.01); *Y10T 83/773* (2015.04); *Y10T 83/7726* (2015.04)

(58) Field of Classification Search
  CPC ......... B27B 5/20; B27B 5/202; B27B 5/207; B27B 5/208; B27B 5/36; B26D 1/14; B26D 1/143; B26D 1/18; B26D 3/02; B26D 5/18; Y10T 83/7701; Y10T 83/7705; Y10T 83/7722; Y10T 83/7726; Y10T 83/773; Y10T 83/8781; Y10T 83/8804; Y10T 83/8808; Y10T 83/8809; B23D 45/068; B23D 45/02; B23D 45/021; B23D 45/022; B23D 45/024; B23D 45/04; B23D 45/06; B23D 45/061; B23D 45/062; B23D 45/063
  See application file for complete search history.

(56) References Cited

U.S. PATENT DOCUMENTS

| | | | | |
|---|---|---|---|---|
| 2,038,810 A | * | 4/1936 | Tautz | ...................... B27B 5/265 83/473 |
| 2,068,964 A | * | 1/1937 | Tautz | ................... B23D 47/025 83/473 |

(Continued)

FOREIGN PATENT DOCUMENTS

| | | |
|---|---|---|
| CN | 202071135 U | 12/2011 |
| JP | 2004338294 A | 12/2004 |

OTHER PUBLICATIONS

International Search Report and Written Opinion corresponding to PCT Application No. PCT/US2014/025749, mailed Jul. 14, 2014 (13 pages).

*Primary Examiner* — Phong Nguyen
(74) *Attorney, Agent, or Firm* — Maginot Moore & Beck LLP

(57) ABSTRACT

A power tool includes a support arrangement and a work surface that is supported by the support arrangement and that includes a top surface having an opening configured to receive a rotatable blade. The power tool also includes a cutting assembly that is supported by the support arrangement and that includes a motor, a drive shaft driven by the motor, and the rotatable blade rotated by the drive shaft. The power tool also includes a height adjustment mechanism coupled to the support arrangement and to the cutting assembly. The height adjustment mechanism is configured to move the cutting assembly upwardly and downwardly relative to the top surface. The height adjustment mechanism includes a threaded shaft, at least one nut threadably coupled to the threaded shaft, and at least one connection member rotatably coupled to the at least one nut and to the cutting assembly.

20 Claims, 7 Drawing Sheets

(56) References Cited

U.S. PATENT DOCUMENTS

| | | | |
|---|---|---|---|
| 2,852,047 A * | 9/1958 | Odlum | B27B 5/243 178/17 R |
| 3,368,596 A * | 2/1968 | Comer | B27B 5/165 144/1.1 |
| 6,009,782 A | 1/2000 | Tajima et al. | |
| 6,283,002 B1 | 9/2001 | Chiang | |
| 6,530,303 B1 | 3/2003 | Parks et al. | |
| 6,820,534 B1 | 11/2004 | Schooler | |
| 7,137,327 B2 | 11/2006 | Garcia et al. | |
| 7,895,929 B2 | 3/2011 | Zhang et al. | |
| 2002/0005103 A1 | 1/2002 | Ceroll et al. | |
| 2004/0107814 A1 * | 6/2004 | Chang | B23D 45/067 83/477.1 |
| 2005/0160895 A1 | 7/2005 | Garcia et al. | |
| 2010/0005939 A1 | 1/2010 | Burke et al. | |
| 2011/0011231 A1 * | 1/2011 | Frolov | B23D 45/068 83/471.2 |
| 2011/0048204 A1 | 3/2011 | Chung | |

* cited by examiner

HEIGHT ADJUSTMENT MECHANISM FOR POWER TOOL

PRIORITY CLAIM

This application claims priority to U.S. provisional patent application No. 61/779,111, filed on Mar. 13, 2013 entitled "Height Adjustment Mechanism for Power Tool," the disclosure of which is incorporated herein by reference in its entirety.

TECHNICAL FIELD

This disclosure relates to power tools and, more particularly, to power table saws.

BACKGROUND

Power tools such as table saws, vertical saws, planers, miter saws, circular saws, band saws, and the like are used in the construction and wood working industries. When a saw blade of a table saw or a cutterhead of a planer comes in contact with a workpiece, e.g., a piece of lumber, to cut the workpiece, the height and angle of the blade relative to the workpiece determines the depth and angle of cut into the workpiece. Because workpieces vary significantly in size and desired cut types, it is advantageous to make saw blades adjustable relative to the work surface of the table saw, and thus adjustable relative to the workpiece supported by the work surface. An example of a table saw with a height adjustment mechanism is depicted in FIG. 1 (titled "Prior Art").

A table saw 10 depicted in FIG. 1 includes a table top 12 with a saw blade opening 14 formed therein. The saw blade 16 extends through the saw blade opening 14 and is configured to rotate about a rotation axis where it is coupled to a motor shaft (not shown). The table saw 10 further includes an on/off switch 18 and a support arrangement 20. The saw blade 16 is configured to cut a workpiece by turning about the rotation axis in a direction depicted by arrow 22 when operated by a saw blade rotation motor (not shown). The particular position of the saw blade 16 relative to the table top 12 is adjusted by rotating a hand wheel 24, which is mounted to a shaft of a support assembly mounted in the support arrangement 20 as described below in more detail.

The hand wheel 24 interacts with bevel gears or a rack and pinion of the table saw 10 to adjust the position of the saw blade 16. However, adjustment of the saw blade 16 using a hand wheel 24 that interacts with bevel gears is difficult because the bevel gears can get jammed with sawdust generated by the table saw 10 during cutting operations. Additionally, adjustment of the saw blade 16 using a hand wheel 24 that interacts with a rack and pinion is difficult because the gears or the rack and pinion are configured with allowances, also known as backlash, which provide some play between the rack and pinion and, therefore, reduce positional accuracy of the saw blade 16. The primary objective of the present disclosure, therefore, is to provide a height adjustment mechanism for a power tool which eliminates the need for bevel gears or a rack and pinion.

SUMMARY

A table saw has a support arrangement, a work surface, a cutting assembly, and a height adjustment mechanism. The support arrangement is configured to support the work surface and the height adjustment mechanism. The cutting assembly includes a saw blade rotationally coupled to a motor and is coupled to the height adjustment mechanism. The height adjustment mechanism is configured to move the cutting assembly upwardly and downwardly relative to the work surface.

In one embodiment, the height adjustment assembly includes a hand wheel, a horizontal threaded shaft, a nut, a connection member, a vertical guide rod, and a spring. The hand wheel is coupled to the horizontal threaded shaft such that turning the hand wheel rotates the horizontal threaded shaft. The nut is coupled to the horizontal threaded shaft such that rotating the horizontal threaded shaft causes the nut to move horizontally along the horizontal threaded shaft. The connection member is coupled to the nut and to the cutting assembly and the cutting assembly is coupled to the vertical guide rod such that moving the nut horizontally along the horizontal threaded shaft causes the cutting assembly to move vertically along the vertical guide rod. When the cutting assembly moves vertically along the vertical guide rod, the cutting assembly moves upwardly or downwardly relative to the work surface. The spring is coupled to the connection member and to the nut to provide additional upward force against the motor assembly weight, to provide greater position accuracy by eliminating gaps in assembly, and to dampen vibrations during movement of the height adjustment mechanism.

In another embodiment, the height adjustment assembly includes a hand wheel, a horizontal threaded shaft with dual threads in opposite directions, two nuts threaded in opposite directions, two connection members oriented in opposite directions, two vertical guide rods, and two springs. The hand wheel is coupled to the horizontal threaded shaft such that turning the hand wheel rotates the horizontal threaded shaft. The two nuts are coupled to the horizontal threaded shaft such that rotating the horizontal threaded shaft causes the nuts to move horizontally in opposite directions along the horizontal threaded shaft. Each connection member is coupled to a nut and to the cutting assembly. The cutting assembly is coupled to the vertical guide rod such that moving the nuts horizontally in opposite directions along the horizontal threaded shaft causes the cutting assembly to move vertically along the vertical guide rods. When the cutting assembly moves vertically along the vertical guide rods, the cutting assembly moves upwardly or downwardly relative to the work surface. Each spring is coupled to one of the connection members and to one of the nuts to provide additional upward force against the motor assembly weight, to provide greater position accuracy by eliminating gaps in assembly, and to dampen vibrations during movement of the height adjustment mechanism.

DETAILED DESCRIPTION

Figure 2:
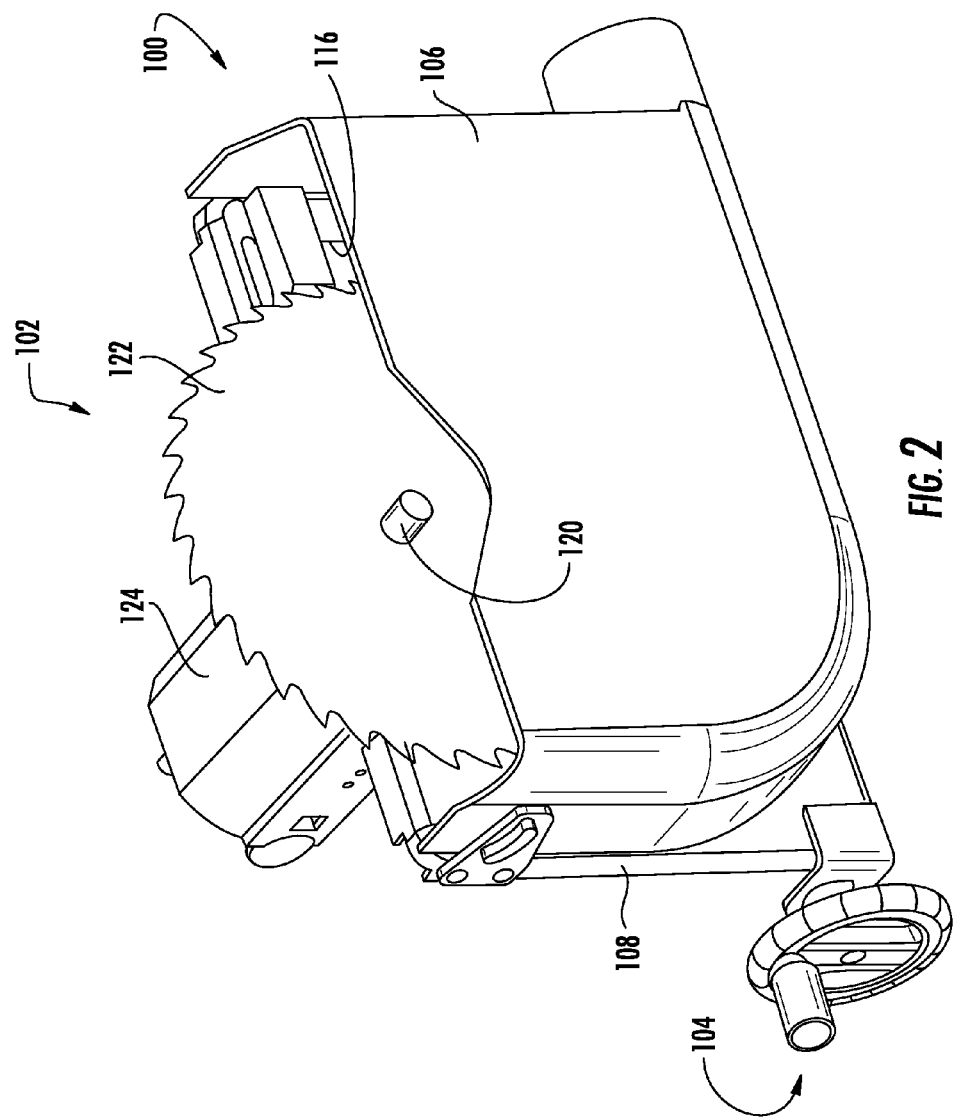
FIG. 2 depicts a right side perspective view of a cutting assembly, a height adjustment mechanism, and a support assembly for use in a power tool such as the table saw of FIG. 1.
Figure 3:
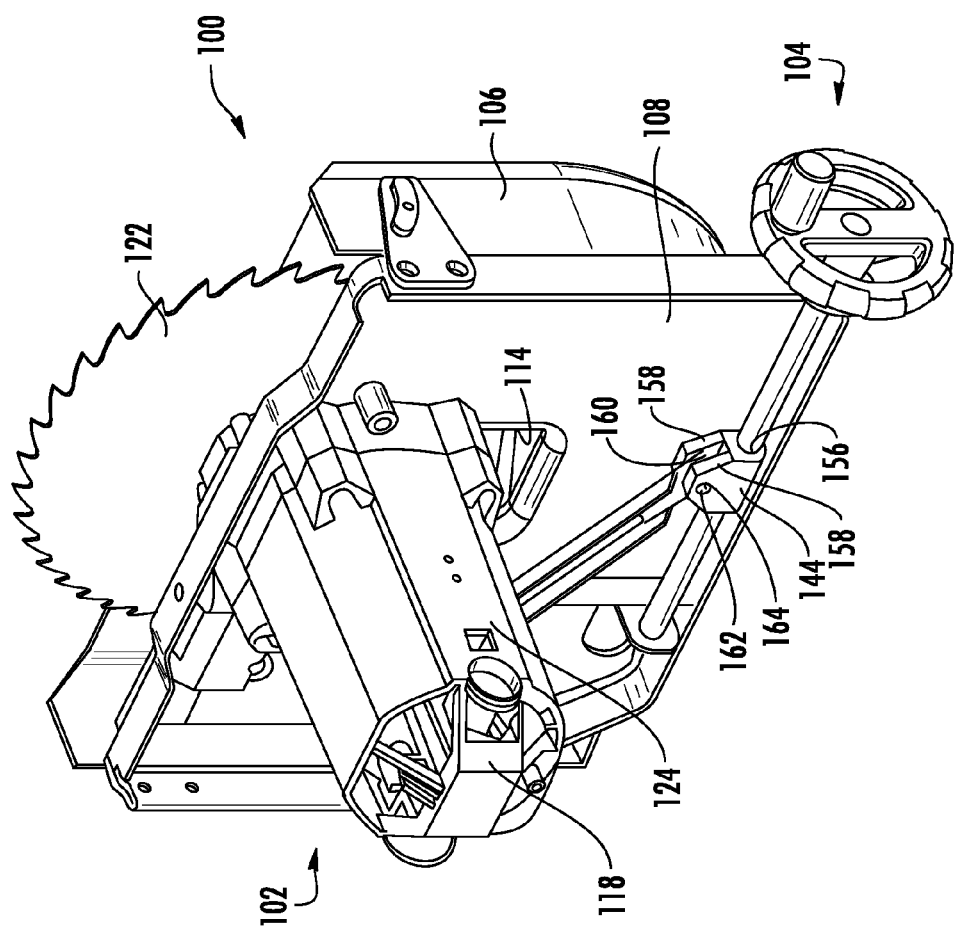
FIG. 3 depicts a left side perspective view of the cutting assembly, the height adjustment mechanism, and the support assembly of FIG. 2.

Turning now to FIG. 2 and FIG. 3, a support assembly 100, a cutting assembly 102, and a height adjustment mechanism 104 are depicted. The support assembly 100, the cutting assembly 102, and the height adjustment mechanism 104 are configured for use in a table saw like the table saw 10 shown in FIG. 10. The support assembly 100 is configured to support the cutting assembly 102 and the height adjustment mechanism 104 such that the height adjustment mechanism 104 is able to move the cutting assembly 102 upwardly and downwardly relative to the support assembly 100.

Figure 1:
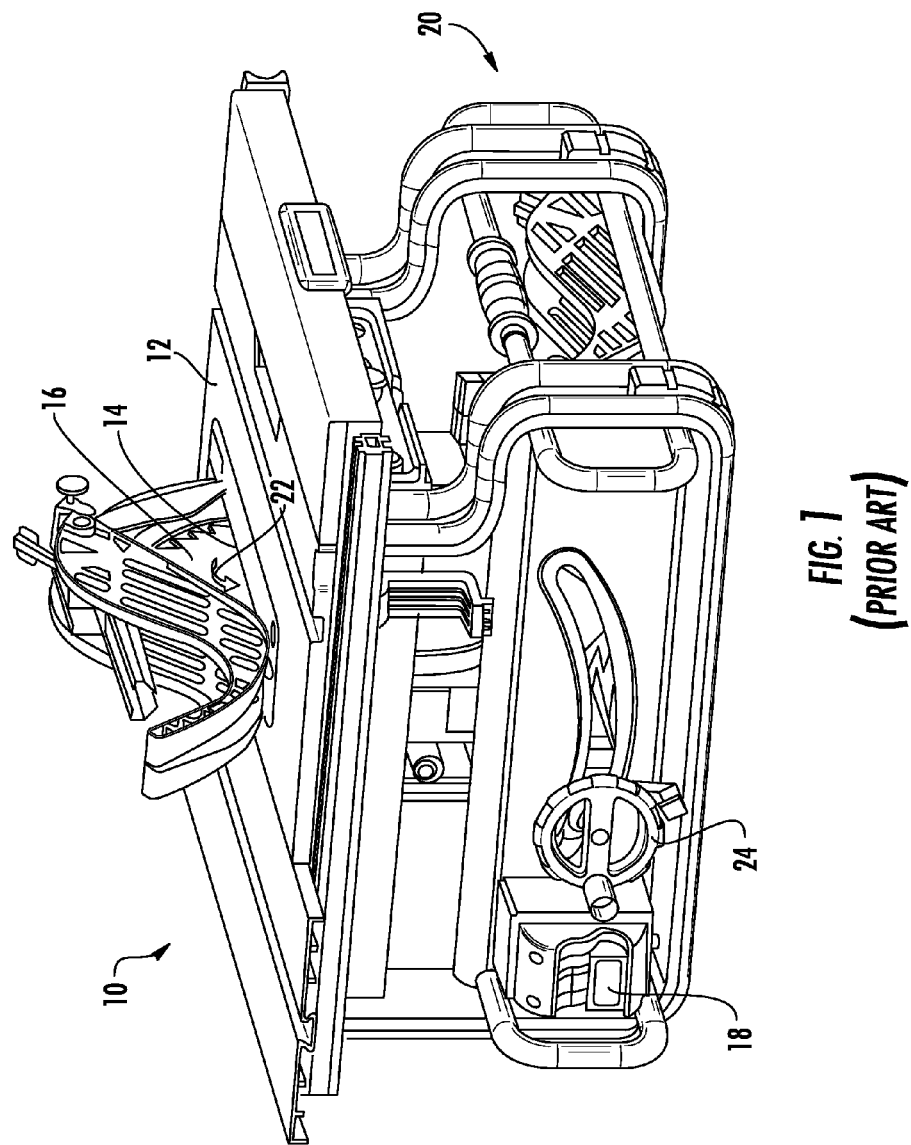
FIG. 1 depicts a top front perspective view of a prior art table saw.

The support assembly 100, which may be integrated into a support arrangement like support arrangement 20 shown in FIG. 1, includes an undercarriage compartment 106 coupled to a support wall 108. The support wall 108 defines a cutting assembly opening 114 (shown in FIG. 3) and a guide portion opening 116 (shown in FIG. 2), both of which extend through the support wall 108.

The cutting assembly 102 includes a motor 118 (shown in FIG. 3), a motor axle 120 (shown in FIG. 2) and a saw blade 122. The motor 118 is supported by a motor carriage 124 that is slidably disposed within the cutting assembly opening 114. The motor 118 is configured to rotate the motor axle 120 when operated with electrical power. The saw blade 122 is fixedly coupled to the motor axle 120 such that rotation of the motor axle 120 by the motor 118 rotates the saw blade 122 relative to the motor 118 and the motor carriage 124. The motor 118 and the saw blade 122 are positioned on opposite sides of the support wall 108 with the motor axle 120 extending through the cutting assembly opening 114 such that operating the motor 118 on one side of the support wall 108 rotates the saw blade 122 on the opposite side of the support wall 108.

Figure 4:
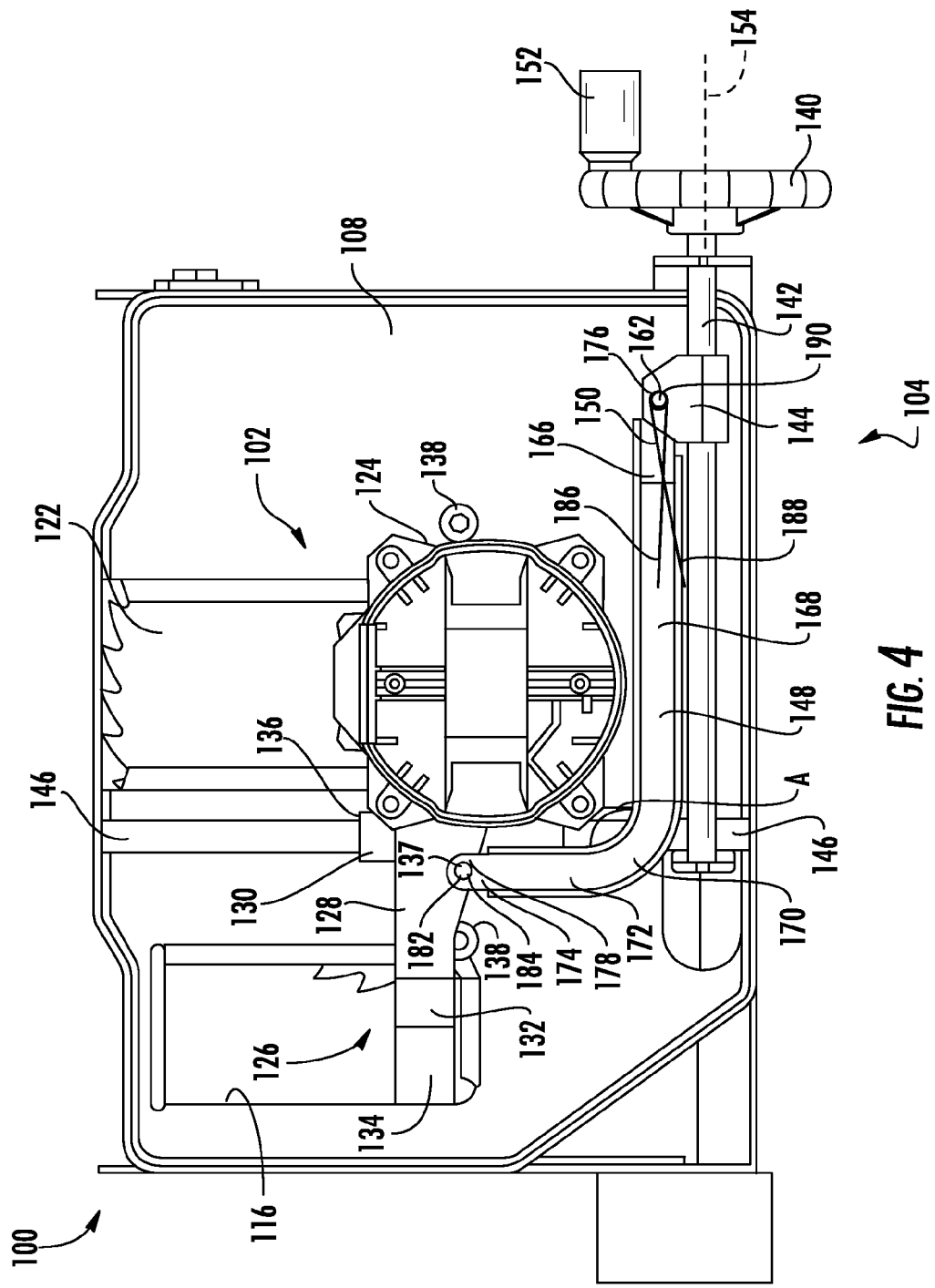
FIG. 4 depicts a back plan view of the cutting assembly, the height adjustment mechanism, and the support assembly of FIG. 2 with the cutting assembly in a first position.

Turning now to FIG. 4, the cutting assembly 102 also includes an arm 126 extending from the motor carriage 124. The arm 126 has a main body 128, a collar 130, an angled portion 132, and a guide portion 134. The main body 128 is fixedly coupled or integrally formed with the motor carriage 124 (shown in FIG. 3) and extends in a direction substantially parallel to the support wall 108. The collar 130 includes a longitudinal opening 136 formed therein which extends from the main body 128 such that the longitudinal opening 136 is arranged substantially parallel to the support wall 108 and substantially perpendicular to the main body 128 of the arm 126. The main body 128 also includes a main body hole 137 formed through the main body 128 in a direction that is substantially perpendicular to the longitudinal opening 136. The angled portion 132 extends from the main body 128 opposite the motor carriage 124 (shown in FIG. 3). The guide portion 134 extends from the angled portion 132 opposite the main body 128 and is arranged substantially parallel to the main body 128. Accordingly, the angled portion 132 is arranged between the main body 128 and the guide portion 134 and offsets the guide portion 134 from the main body 128. The arm 126 is arranged such that the main body 128 is positioned on the same side of the support wall 108 as the motor 118, the angled portion 132 extends through the guide portion opening 116 in the support wall 108, and the guide portion 134 is positioned on the same side of the support wall 108 as the saw blade 122.

The cutting assembly 102 also includes two pads 138 arranged on opposite sides of the motor carriage 124. The pads 138 are essentially comprised of a plastic or rubber material and are configured to slide along the support wall 108 as the cutting assembly 102 is moved upwardly and downwardly relative to the support assembly 100. The pads 138 are coupled to the cutting assembly 102 such that they can be adjusted by screws (not shown).

The height adjustment mechanism 104 includes a hand wheel 140, a horizontal threaded shaft 142, a first member 144, referred to hereinafter as a nut, a vertical guiding rod 146, a second member 148, referred to hereinafter as a connection member, and a spring 150. The height adjustment mechanism 104 is coupled to the support assembly 100 and to the cutting assembly 102 such that operating the height adjustment mechanism 104 moves the cutting assembly 102 upwardly and downwardly relative to the support assembly 100 to adjust the height of the saw blade 122 relative to the table top of the power tool.

The hand wheel 140 includes a grip 152 and an axis 154 and is configured such that a user grasps the grip 152 to rotate the hand wheel 140 about the axis 154. The horizontal threaded shaft 142 is fixedly coupled to the hand wheel 140 at the axis 154 such that rotating the hand wheel 140 about the axis 154 rotates the horizontal threaded shaft 142. The horizontal threaded shaft 142 is coupled to the support wall 108 so as to enable rotation of the horizontal threaded shaft 142 while retaining the horizontal threaded shaft 142 in a fixed location relative to the support assembly 100.

Returning to FIG. 3, the nut 144 includes an internally threaded opening 156, two arms 158 separated by a gap 160, and a pin 162. The nut 144 is arranged and configured so that the horizontal threaded shaft 142 passes through the internally threaded opening 156. Accordingly, the nut 144 is threaded onto the horizontal threaded shaft 142 and moves along the horizontal threaded shaft 142 in a first direction and an opposite second direction as the horizontal threaded shaft 142 rotates. The two arms 158 are arranged parallel to one another and each includes a pin hole 164 configured to fixedly receive a portion of the pin 162. When a portion of the pin 162 is received within both of the pin holes 164, the pin 162 spans the gap 160.

Returning now to FIG. 4, the vertical guiding rod 146 is fixedly coupled to the support wall 108 of the support assembly 100 and is arranged substantially perpendicular to the horizontal threaded shaft 142. The vertical guiding rod 146 is sized and configured so as to be slidably received within the longitudinal opening 136 of the collar 130.

The connection member 148 includes a first end 166, a first elongated portion 168, a bend 170, a second elongated portion 172, and a second end 174. The first end 166 is opposite the second end 174. The first elongated portion 168 extends from the first end 166 and the second elongated portion 172 extends from the second end 174. The bend 170 is located between the first elongated portion 168 and the second elongated portion 172 and forms an angle A between the first elongated portion 168 and the second elongated portion 172. The connection member 148 is configured to move around the motor carriage 124 and to avoid interference with the motor carriage 124 when the connection member 148 is in any position, including the lowest position (shown in FIG. 4). In this embodiment, the angle A is approximately 90 degrees. In other embodiments, however, the angle A can be a different angle.

The first end 166 includes a first end hole 176 sized and configured to receive the pin 162 such that the first end 166 is free to rotate about the pin 162. Accordingly, the first end 166 of the connection member 148 is rotatably coupled to the nut 144 when the pin 162 is received within the pin holes 164 (shown in FIG. 3) and the first end hole 176.

The second end 174 includes two arms 178 separated by a gap (not shown), and a pin 182. The two arms 178 are arranged parallel to one another and each include a pin hole 184 configured to fixedly receive a portion of the pin 182. When a portion of the pin 182 is received within both of the pin holes 184, the pin 182 spans the gap. The second end 174 is arranged such that the pin holes 184 align with the main body hole 137. The pin 182 is configured to be received through the pin holes 184 and the main body hole 137 such that the main body 128 is free to rotate about the pin 182. Accordingly, the second end 174 of the connection member 148 is rotatably coupled to the main body 128 of the arm 126 when the pin 182 is received within the pin holes 184 and the main body hole 137.

The spring 150 is coupled to the nut 144 and to the connection member 148 and is in contact with the horizontal threaded shaft 142. The spring 150 is configured to bias the connection member 148 and the horizontal threaded shaft 142 away from one another at the nut 144. More specifically, the spring 150 is a torsion spring and includes a first spring end 186, a second spring end 188, and a vertex coil 190. The first spring end 186 is coupled to and extends substantially along the first elongated portion 168 of the connection member 148. The vertex coil 190 is positioned at or around the pin 162 of the nut 144. The second spring end 188 is in contact with the horizontal threaded shaft 142. The spring 150 is configured to bias the connection member 148 and the horizontal threaded shaft 142 away from one another to provide additional upward force against the motor assembly weight, to provide greater position accuracy by eliminating gaps in assembly, and to dampen vibrations during movement of the height adjustment mechanism.

Figure 5:
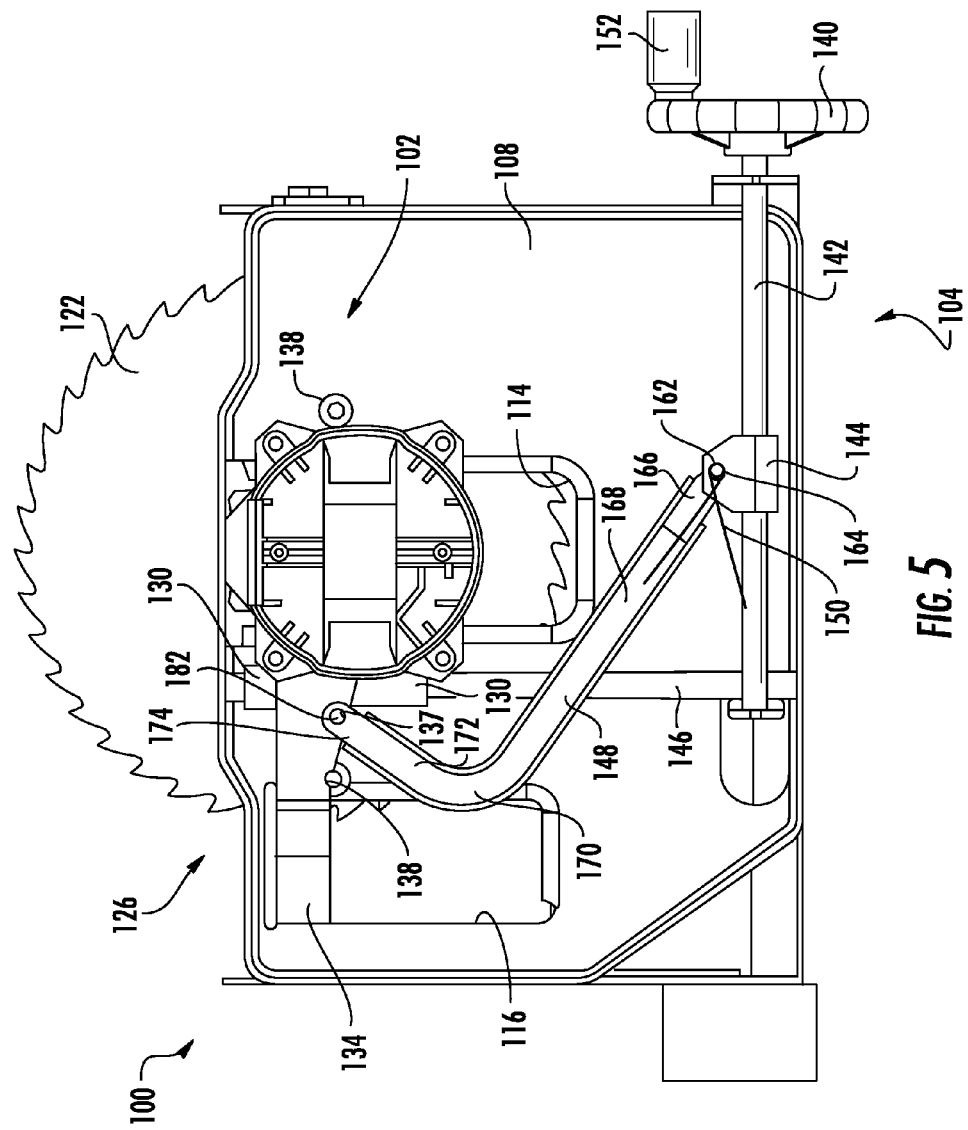
FIG. 5 depicts a back plan view of the cutting assembly, the height adjustment mechanism, and the support assembly of FIG. 2 with the cutting assembly in a second position.

In operation, the height adjustment mechanism 104 is operated to move the cutting assembly 102 relative to the support assembly 100 between a first position (shown in FIG. 4), wherein the saw blade 122 is lowered relative to the support assembly 100, and a second position (shown in FIG. 5), wherein the saw blade 122 is raised relative to the support assembly 100. The height adjustment mechanism 104 is configured to enable moving the cutting assembly 102 to any desired height between and including the first position and the second position relative to the table top of the table saw. To raise the saw blade 122, a user grasps the grip 152 of the hand wheel 140 and rotates the hand wheel 140 in a raising direction which may be indicated on the hand wheel 140. As the hand wheel 140 is rotated in the raising direction, the horizontal threaded shaft 142 is rotated relative to the support wall 108 and the threads of the horizontal threaded shaft 142 engage with the threads of the internally threaded opening 156 (shown in FIG. 3) to apply horizontal force to the nut 144. The horizontal force applied to the nut 144 moves the nut 144 along the horizontal threaded shaft 142 in the first direction, away from the hand wheel 140. The nut 144 transfers the horizontal and rotational forces to the first elongated portion 168 through the pin 162 at the pin holes 164. Accordingly, the nut 144 forces the first elongated portion 168 away from the hand wheel 140 as the nut 144 moves along the horizontal threaded shaft 142. Concurrently, the spring 150 applies a rotational force to the first elongated portion 168 in a direction away from the horizontal threaded shaft 142 at the nut 144. The first end 166 rotates freely about the pin 162 at the nut 144 under the horizontal and rotational forces applied to the first elongated portion 168.

The horizontal and rotational forces applied the first elongated portion 168 of the connection member 148 are translated through the bend 170 of the connection member 148 to the second elongated portion 172 of the connection member 148. Thus, the horizontal and rotational forces applied to the first elongated portion 168 are translated to vertical and rotational forces which are simultaneously applied to the second elongated portion 172. The second end 174 rotates freely about the pin 182 at the main body 128 under the vertical and rotational forces applied to the second elongated portion 172. The second elongated portion 172 transfers the vertical and rotational forces to the arm 126 through the pin 182 at the main body hole 137. Because the collar 130 of the arm 126 slidably receives the vertical guiding rod 146, the vertical and rotational forces applied to the arm 126 are translated to a vertical force in a third direction, upwardly along the vertical guiding rod 146.

As the collar 130 of the cutting assembly 102 is forced in the third direction vertically along the guiding rod 146 of the height adjustment mechanism 104, the cutting assembly 102 moves upwardly relative to the support assembly 100. Accordingly, the guide portion 134 of the cutting assembly 102 also moves upwardly relative to the guide portion opening 116 of the support assembly 100. The guide portion opening 116 of the support assembly limits the upward movement of the guide portion 134 of the support assembly 100. Accordingly, when the guide portion 134 contacts the upper end of the guide portion opening 116, the cutting assembly is raised relative to the support assembly 100 and is in the second position (shown in FIG. 5).

To lower the cutting assembly 102 relative to the support assembly 100, the hand wheel 140 is rotated in the opposite direction, which may also be indicated on the hand wheel 140. As the hand wheel 140 is rotated in the opposite direction, the raising process described above is carried out in the opposite direction, thereby reversing the raising process into a lowering process. Accordingly, the nut 144 moves along the horizontal threaded shaft 142 in the second direction, toward the hand wheel 140, and forces the first elongated portion 168 toward the hand wheel 140 compressing the spring 150 against its rotational force.

The horizontal and rotational forces applied the first elongated portion 168 are translated to vertical and rotational forces which are simultaneously applied to the second elongated portion 172 which transfers the vertical and rotational forces to the arm 126. Because the collar 130 of the arm 126 slidably receives the vertical guiding rod 146, the vertical and rotational forces applied to the arm 126 are translated to a vertical force along the vertical guiding rod 146 and as the collar 130 of the cutting assembly 102 is forced in a fourth direction vertically along the guiding rod 146 of the height adjustment mechanism 104, the cutting assembly 102 moves downwardly relative to the support assembly 100. The guide portion opening 116 of the support assembly limits the downward movement of the guide portion 134 of the support assembly 100 so that when the guide portion 134 contacts the lower end of the guide portion opening 116, the cutting assembly 102 is lowered relative to the support assembly 100 and is again in the first position (shown in FIG. 4).

As the cutting assembly 102 moves upwardly and downwardly relative to the support assembly 100, the spring 150 dampens vibrations of the height adjustment mechanism 104 to enable the cutting assembly 102 to move more smoothly. As the cutting assembly 102 moves upwardly and downwardly relative to the support assembly 100, the pads 138 provide cushion to the cutting assembly 102 which is being forced against the support assembly 100. This cushion also enables the cutting assembly to move more smoothly. The guide portion 134 is configured to ride along the support wall 108 to prevent the rotational forces on the arm 126 from rotating the cutting assembly 102 relative to the support wall 108.

Figure 6:
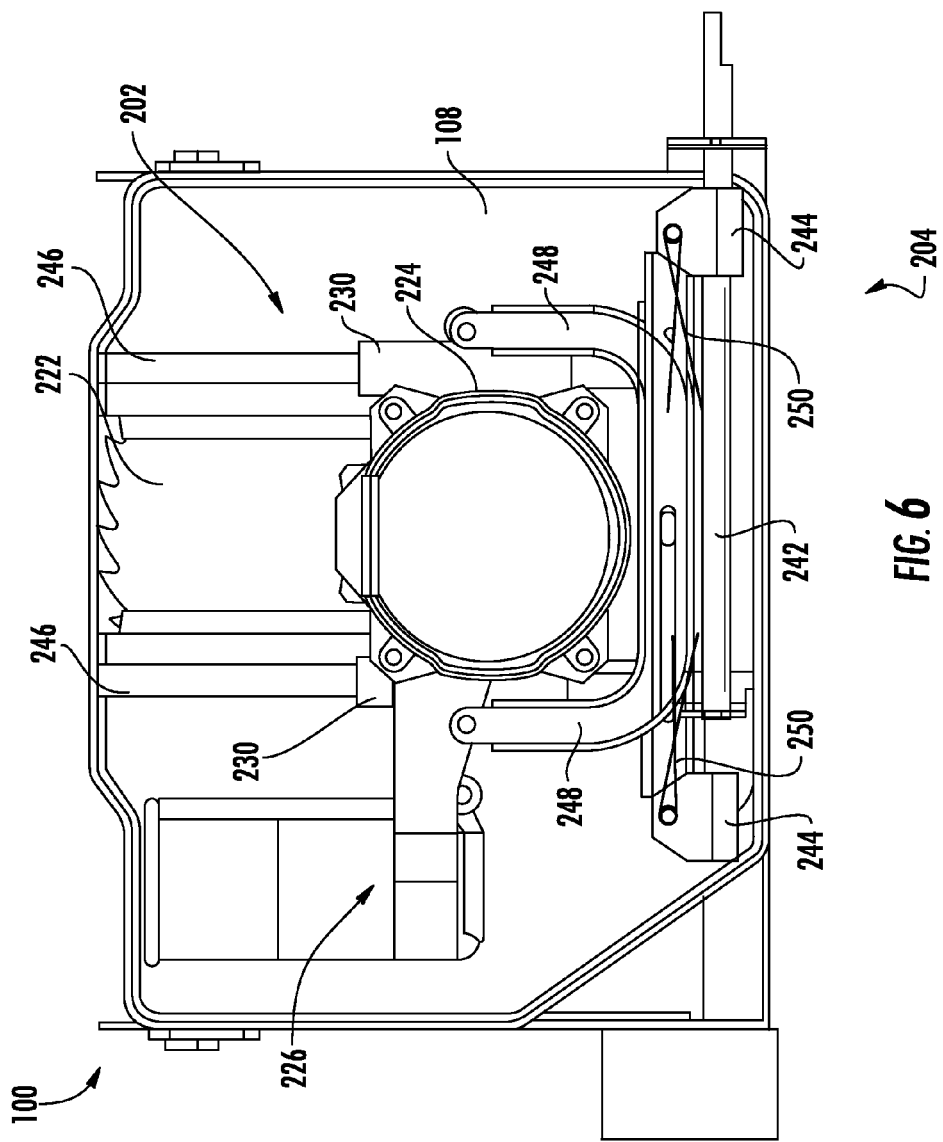
FIG. 6 depicts a back plan view of the cutting assembly, the support assembly, and another height adjustment mechanism for use with a table saw like the table saw of FIG. 1 with the cutting assembly in a first position.
Figure 7:
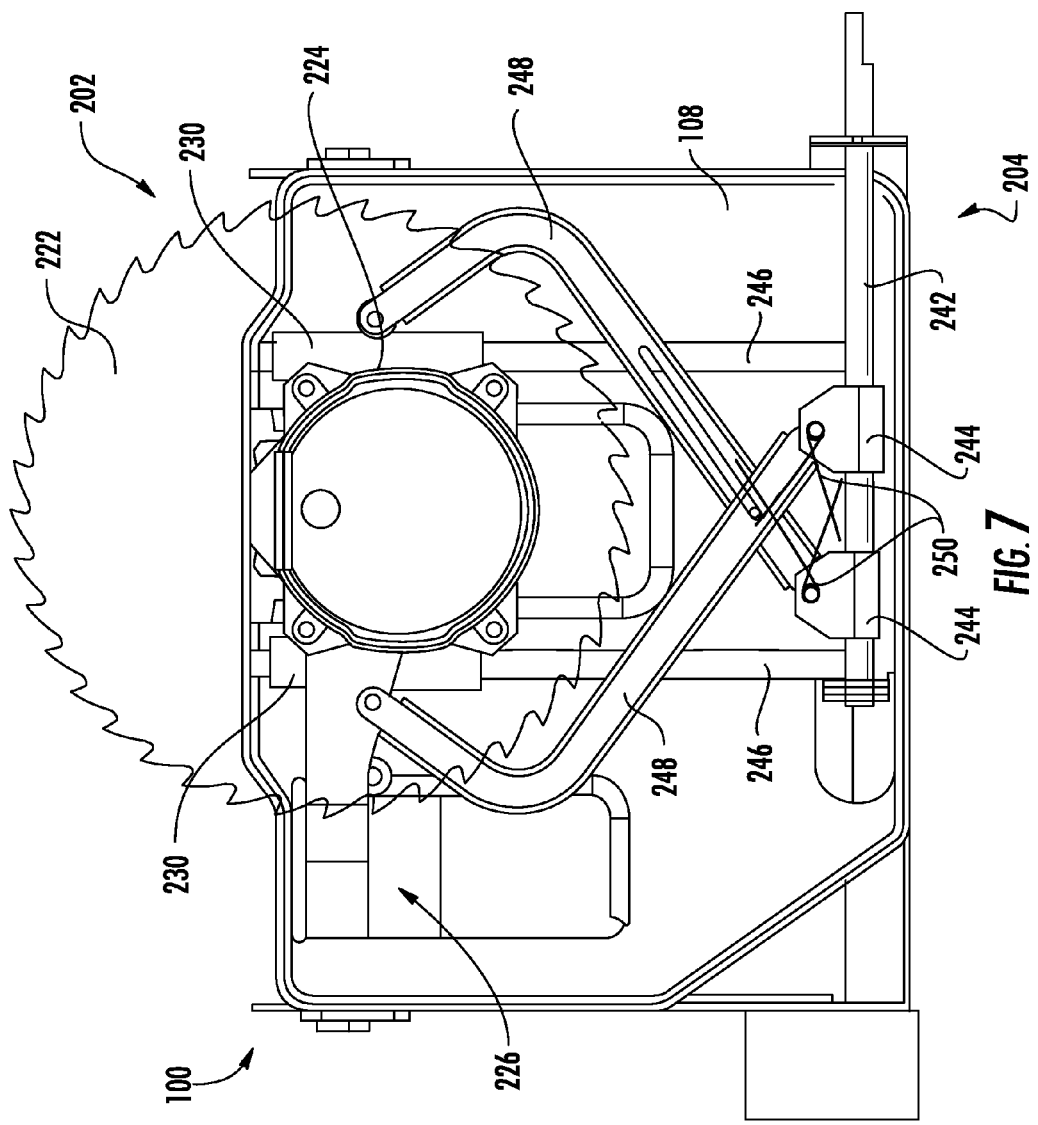
FIG. 7 depicts a back plan view of the cutting assembly, the support assembly, and the height adjustment mechanism of FIG. 6 with the cutting assembly in a second position.

Turning now to FIG. 6 and FIG. 7, another height adjustment mechanism 204 and cutting assembly 202 are shown with the support assembly 100. The height adjustment mechanism 204 is substantially similar in arrangement and operation to the height adjustment mechanism 104. The height adjustment mechanism 204 differs from the height adjustment mechanism 104, however, in that the height adjustment mechanism 204 has dual height adjustment mechanisms arranged and configured substantially the same as the single height adjustment mechanism 104 to provide better force balance as equal horizontal forces will cancel each other. More specifically, the height adjustment mechanism 204 includes two nuts 244, two vertical guiding rods 246, two connection members 248, and two springs 250. The cutting assembly 202 is substantially similar in arrangement and operation to the cutting assembly 102. The cutting assembly 202 differs from the cutting assembly 102, however, in that the arm 226 of the cutting assembly 202 includes two collars 230 coupled to the motor carriage 224.

Regarding the height adjustment mechanism 204, the two nuts 244 are each substantially similar to the nut 144 of the height adjustment mechanism 104. The threads in the internally threaded openings of the nuts 244, however, are oriented in opposite directions. The nuts 244 are arranged and configured so that the horizontal threaded shaft 242 passes through the internally threaded openings. Accordingly, the nuts 244 are threaded onto the horizontal threaded shaft 242 and move in opposite directions along the horizontal threaded shaft 242 as the horizontal threaded shaft 242 rotates.

The two vertical guiding rods 246 are substantially similar to the guiding rod 146 of the height adjustment mechanism 104. The two vertical guiding rods 246 are fixedly coupled to the support wall 108 of the support assembly 100 and are arranged substantially perpendicular to the horizontal threaded shaft 242. The vertical guiding rods 246 are sized and configured so as to be slidably received within the longitudinal openings of the collars 230 of the cutting assembly 202.

The two connection members 248 are substantially similar to the connection member 148 of the height adjustment mechanism 104. In the height adjustment mechanism 204, the connection members 248 are oriented in opposite directions such that they mirror each other in arrangement and operation.

The two springs 250 are substantially similar to the spring 150 of the height adjustment mechanism 104. Each spring 250 is coupled to one of the two nuts 244 and to one of the two connection members 248 and is in contact with the horizontal threaded shaft 242. The springs 250 are configured to bias the connection members 248 and the horizontal threaded shaft 242 away from one another at the nuts 244.

In operation, the height adjustment mechanism 204 is operated to move the cutting assembly 202 relative to the support assembly 100 in substantially the same manner as the height adjustment mechanism 104, but with better force balancing than the height adjustment mechanism 104 as the horizontal forces are equal and cancel each other. The height adjustment mechanism 204 moves the cutting assembly 202 between a first position (shown in FIG. 6), wherein the saw blade 222 is lowered relative to the support assembly 100, and a second position (shown in FIG. 7), wherein the saw blade 222 is raised relative to the support assembly 100.

To raise the cutting assembly 202 relative to the support assembly 100, the operator rotates the hand wheel in the raising direction to rotate the horizontal threaded shaft 242 relative to the support wall 108 thereby engaging the threads of the horizontal threaded shaft 242 with the threads of the internally threaded opening of the nuts 244 to apply horizontal force to the nuts 244. The horizontal force applied to the nuts 244 moves the nuts 244 in opposite directions toward each other along the horizontal threaded shaft 242, and the nuts 244 transfer the horizontal and rotational forces to the corresponding connection member 248 such that the connection members 248 are forced toward each other. Concurrently, the springs 250 apply a rotational force to the corresponding connection member 248 in a direction away from the horizontal threaded shaft 242 at the nuts 244.

The horizontal and rotational forces applied to the connection members 248 are translated through the connection members 248 to the first elongated portions 268 and are translated to vertical and rotational forces which are transferred to the arm 226. Because the collars 230 of the arm 226 slidably receive the vertical guiding rods 246, the vertical and rotational forces applied to the arm 226 are translated to a vertical force along the vertical guiding rods 246. As the collars 230 of the cutting assembly 202 are forced vertically along the guiding rods 246 of the height adjustment mechanism 204, the cutting assembly 202 moves upwardly relative to the support assembly 100 until the cutting assembly 202 is in the second position (shown in FIG. 7).

To lower the cutting assembly 202 relative to the support assembly 100, the operator rotates the hand wheel in the lowering direction to rotate the horizontal threaded shaft 242 relative to the support wall 108 and thereby engage the threads of the horizontal threaded shaft 242 with the threads of the internally threaded openings to apply horizontal force to the nuts 244. The horizontal force applied to the nuts 244 moves the nuts 244 in opposite directions away from one another along the horizontal threaded shaft 142, and the nuts 244 transfer the horizontal and rotational forces to the corresponding connection member 248 to force the connection members 248 away from each other. Concurrently, the springs 250 are compressed against their rotational force as the connection members 248 are moved toward the horizontal threaded shaft 242 at the nuts 244.

The horizontal and rotational forces applied to the connection members 248 are translated through the connection members 248 and are translated to vertical and rotational forces which are simultaneously applied to the arm 226. Because the collars 230 of the arm 226 slidably receive the vertical guiding rods 246, the vertical and rotational forces applied to the arm 226 are translated to a vertical force along the vertical guiding rods 246. As the collars 230 of the cutting assembly 202 are forced vertically along the guiding rods 246 of the height adjustment mechanism 204, the cutting assembly 202 moves downwardly relative to the support assembly 100 until the cutting assembly is again in the first position (shown in FIG. 6).

Exemplary features of the disclosed height adjustment mechanism include a hand wheel, a horizontal threaded shaft, at least one nut, at least one connection member, at least one vertical guide rod, and at least one spring. The hand wheel is coupled to the horizontal threaded shaft such that turning the hand wheel rotates the horizontal threaded shaft. The at least one nut is coupled to the horizontal threaded shaft such that rotating the horizontal threaded shaft causes the at least one nut to move horizontally along the horizontal threaded shaft. The at least one connection member is coupled to the at least one nut and to a cutting assembly and the cutting assembly is coupled to the at least one vertical guide rod such that moving the at least one nut horizontally along the horizontal threaded shaft causes the cutting assembly to move vertically along the at least one vertical guide rod. When the cutting assembly moves vertically along the at least one vertical guide rod, the cutting assembly moves upwardly or downwardly relative to a work surface. The at least one spring is coupled to the at least one connection member and to the at least one nut to dampen vibrations during movement of the height adjustment mechanism.

While the invention has been illustrated and described in detail in the drawings and foregoing description, the same should be considered illustrative and not restrictive in character. Only the preferred embodiments have been presented and all changes, modifications and further applications that come within the spirit of the invention are desired to be protected.

What is claimed is:

1. A power tool, comprising:
   a support arrangement configured to support the power tool on a surface;
   a work surface supported by the support arrangement and including a top surface with an opening configured to receive a rotatable blade;
   a cutting assembly supported by the support arrangement, the cutting assembly including a motor, a drive shaft driven by the motor, and the rotatable blade rotated by the drive shaft; and
   a height adjustment mechanism coupled between the support arrangement and the cutting assembly and configured to move the cutting assembly upwardly and downwardly relative to the top surface, the height adjustment mechanism including:
      a first member configured to move in a first direction and a second direction; and
      a second member having a first end coupled to the first member and a second end coupled to the cutting assembly, the second member movable in a third direction to move the cutting assembly upwardly when the first member moves in the first direction and movable in a fourth direction to move the cutting assembly downwardly when the first member moves in the second direction, wherein:
   the second member is only coupled to the power tool at the first end and the second end;
   the height adjustment mechanism further includes a threaded shaft, the first member is at least one nut threadably coupled to the threaded shaft, and the second member is at least one connection member coupled to the at least one nut and to the cutting assembly;
   the at least one nut is threadably coupled to the threaded shaft such that rotation of the threaded shaft in a first rotational direction moves the at least one nut along the threaded shaft in a first lateral direction and rotation of the threaded shaft in a second rotational direction moves the at least one nut along the threaded shaft in a second lateral direction;
   the height adjustment mechanism further includes at least one guide rod coupled to the support arrangement, the cutting assembly is coupled to an arm configured to be slidably received on the at least one guide rod, and the at least one connection member is coupled to the cutting assembly via the arm; and
   movement of the at least one nut in the first lateral direction moves the cutting assembly upwardly along the at least one guide rod and movement of the at least one nut in the second lateral direction moves the cutting assembly downwardly along the at least one guide rod.

2. The power tool of claim 1, wherein the second member includes a bend configured to enable movement of the second member without interference with the cutting assembly.

3. The power tool of claim 1, wherein the height adjustment mechanism further includes a hand wheel configured to rotate the threaded shaft.

4. The power tool of claim 1, wherein the support arrangement further includes an opening configured to receive a portion of the arm.

5. The power tool of claim 1, wherein the at least one guide rod is oriented substantially perpendicularly to the threaded shaft.

6. The power tool of claim 1, wherein the height adjustment mechanism further includes at least one spring coupled to the at least one nut and the at least one connection member and configured to bias the at least one connection member away from the threaded shaft.

7. The power tool of claim 1, wherein:
   the threaded shaft includes dual threads oriented in opposite directions, and
   the at least one nut includes two nuts threaded in opposite directions and threadably coupled to the threaded shaft such that rotation of the threaded shaft in a first rotational direction moves the two nuts toward each other along the threaded shaft and rotation of the threaded shaft in a second rotational direction moves the two nuts away from each other along the threaded shaft.

8. The power tool of claim 7, wherein the at least connection member includes two connection members, each connection member rotatably coupled to a corresponding nut and to the cutting assembly.

9. The power tool of claim 8, wherein the height adjustment mechanism further includes two springs, each spring coupled to a corresponding nut and a corresponding connection member, the two springs configured to bias the corresponding connection members away from the threaded shaft.

10. The power tool of claim 8, wherein:
    the height adjustment mechanism further includes two guide rods coupled to the support arrangement,
    the cutting assembly is coupled to an arm configured to be slidably received on the two guide rods, and
    each connection member is coupled to the cutting assembly via the arm.

11. The power tool of claim 10, wherein movement of the two nuts toward each other along the threaded shaft moves the cutting assembly upwardly along the two guide rods and movement of the two nuts away from each other along the threaded shaft moves the cutting assembly downwardly along the two guide rods.

12. The power tool of claim 10, wherein the support arrangement further includes an opening configured to receive a portion of the arm.

13. The power tool of claim 10, wherein the two guide rods are oriented substantially parallel to one another and substantially perpendicularly to the threaded shaft.

14. The power tool of claim 1, wherein the at least one connection member is configured to avoid interference with the cutting assembly.

15. The power tool of claim 1, wherein the cutting assembly further includes at least one pad configured to rest on the support arrangement.

16. A power tool, comprising:
 a support arrangement configured to support the power tool on a surface;
 a work surface supported by the support arrangement and including a top surface with an opening configured to receive a rotatable blade;
 a cutting assembly supported by the support arrangement, the cutting assembly including a motor, a drive shaft driven by the motor, and the rotatable blade rotated by the drive shaft; and
 a height adjustment mechanism coupled between the support arrangement and the cutting assembly and configured to move the cutting assembly upwardly and downwardly relative to the top surface, the height adjustment mechanism including:
  a first member configured to move in a first direction and a second direction; and
  a second member having a first end coupled to the first member and a second end coupled to the cutting assembly, the second member movable in a third direction to move the cutting assembly upwardly when the first member moves in the first direction and movable in a fourth direction to move the cutting assembly downwardly when the first member moves in the second direction, wherein:
 the second member is only coupled to the power tool at the first end and the second end;
 the height adjustment mechanism further includes a threaded shaft, the first member is at least one nut threadably coupled to the threaded shaft, and the second member is at least one connection member coupled to the at least one nut and to the cutting assembly;
 the at least one nut is threadably coupled to the threaded shaft such that rotation of the threaded shaft in a first rotational direction moves the at least one nut along the threaded shaft in a first lateral direction and rotation of the threaded shaft in a second rotational direction moves the at least one nut along the threaded shaft in a second lateral direction;
 the height adjustment mechanism further includes at least one guide rod coupled to the support arrangement, the cutting assembly is coupled to an arm configured to be slidably received on the at least one guide rod, and the at least one connection member is coupled to the cutting assembly via the arm; and
 the at least one guide rod is oriented substantially perpendicularly to the threaded shaft.

17. The power tool of claim 16, wherein the second member includes a bend configured to enable movement of the second member without interference with the cutting assembly.

18. The power tool of claim 16, wherein the height adjustment mechanism further includes a hand wheel configured to rotate the threaded shaft.

19. The power tool of claim 16, wherein the support arrangement further includes an opening configured to receive a portion of the arm.

20. A power tool, comprising:
 a support arrangement configured to support the power tool, the support arrangement including a support wall;
 a work surface supported by the support arrangement and including a top surface with an opening configured to receive a rotatable blade;
 a cutting assembly including a motor, a drive shaft driven by the motor, and the rotatable blade rotated by the drive shaft, the cutting assembly supported by the support arrangement such that the motor is arranged on a first side of the support wall and the rotatable blade is arranged on an opposite second side of the support wall; and
 a height adjustment mechanism coupled to the support arrangement and to the cutting assembly and configured to move the cutting assembly upwardly and downwardly relative to the top surface, the height adjustment mechanism including:
  a first member configured to move in a first direction and a second direction; and
  a second member coupled to the first member and to the cutting assembly, the second member movable in a third direction to move the cutting assembly upwardly when the first member moves in the first direction, and the second member movable in a fourth direction to move the cutting assembly downwardly when the first member moves in the second direction, wherein:
 the second member is not coupled to the support wall;
 the height adjustment mechanism further includes a threaded shaft, the first member is at least one nut threadably coupled to the threaded shaft, and the second member is at least one connection member coupled to the at least one nut and to the cutting assembly;
 the at least one nut is threadably coupled to the threaded shaft such that rotation of the threaded shaft in a first rotational direction moves the at least one nut along the threaded shaft in a first lateral direction and rotation of the threaded shaft in a second rotational direction moves the at least one nut along the threaded shaft in a second lateral direction;
 the height adjustment mechanism further includes at least one guide rod coupled to the support arrangement, the cutting assembly is coupled to an arm configured to be slidably received on the at least one guide rod, and the at least one connection member is coupled to the cutting assembly via the arm; and
 movement of the at least one nut in the first lateral direction moves the cutting assembly upwardly along the at least one guide rod and movement of the at least one nut in the second lateral direction moves the cutting assembly downwardly along the at least one guide rod.

* * * * *